(12) United States Patent
Kim

(10) Patent No.: US 9,069,821 B2
(45) Date of Patent: Jun. 30, 2015

(54) METHOD OF PROCESSING FILES IN STORAGE SYSTEM AND DATA SERVER USING THE METHOD

(71) Applicant: ELECTRONICS AND TELECOMMUNICATIONS RESEARCH INSTITUTE, Daejeon (KR)

(72) Inventor: Dong-Oh Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 178 days.

(21) Appl. No.: 13/862,913

(22) Filed: Apr. 15, 2013

(65) Prior Publication Data

US 2013/0282756 A1  Oct. 24, 2013

(30) Foreign Application Priority Data

Apr. 23, 2012 (KR) .................. 10-2012-0042302

(51) Int. Cl.
*G06F 17/30* (2006.01)
(52) U.S. Cl.
CPC .... *G06F 17/30545* (2013.01); *G06F 17/30203* (2013.01)

(58) Field of Classification Search
CPC ....................................... G06F 17/30
USPC ................................. 707/600–899
See application file for complete search history.

(56) References Cited

U.S. PATENT DOCUMENTS

| | | | |
|---|---|---|---|
| 2003/0105767 A1* | 6/2003 | Sonoda et al. | 707/100 |
| 2006/0123064 A1 | 6/2006 | Kim et al. | |
| 2010/0094806 A1 | 4/2010 | Apostolides et al. | |
| 2011/0202722 A1 | 8/2011 | Satran et al. | |
| 2011/0213921 A1 | 9/2011 | Yu et al. | |

FOREIGN PATENT DOCUMENTS

| | | |
|---|---|---|
| KR | 10-2006-0064503 | 6/2006 |
| KR | 10-2007-0038665 | 4/2007 |

* cited by examiner

*Primary Examiner* — Isaac M Woo
(74) *Attorney, Agent, or Firm* — Staas & Halsey LLP

(57) ABSTRACT

The present invention relates to a file processing method using a data server included in a storage system, such as a Network File System (NFS) or a Distributed File System (DFS). When a file request is received from a client, a file corresponding to the request is loaded. Processing requested by the client is performed on the loaded file. A result file on which the processing has been performed is generated and transmitted to the client. Accordingly, the redundant resources of the data server can be sufficiently used, unnecessary data transmission can be reduced, and the resources of the storage system can be efficiently used.

13 Claims, 3 Drawing Sheets

METHOD OF PROCESSING FILES IN STORAGE SYSTEM AND DATA SERVER USING THE METHOD

CROSS-REFERENCE TO RELATED APPLICATION

This application claims priority to Korean Patent Application No. 10-2012-0042302, filed on Apr. 23, 2012, which is incorporated herein by reference in its entirety.

BACKGROUND OF THE INVENTION

1. Field of the Invention

Exemplary embodiments of the present invention relate to an invention for performing file processing in a storage system, such as a Network File System (NFS) or a Distributed File System (DFS); and, particularly, to a file processing method for performing processing necessary for a file requested by a data server when a client requests the file from the data server and sending the result file to the client.

2. Description of Related Art

In a storage system, common data I/O corresponds to the exchange of data between a Central Processing Unit (CPU) and peripheral devices, and communication between the CPU and the peripheral devices is performed through the mediation of files. A file system manages the files, and the I/O is performed through system function commands, such as open( ), read( ), write( ), sync( ), close( ), lseek( ), and truncate( ).

In particular, a storage system, such as a Network File System (NFS) or a Distributed File System (DFS), configured to provide files to clients remotely as if it uses the resources of a server as its own resources on the clients in order to share the resources of the server and a file system, is used a lot. In this storage system, a data server plays an important role of managing files efficiently and transferring the files to a client rapidly.

In the execution of common file-related functions in a storage system, as shown in FIG. 1, when a client 102 requests a necessary file from a data server 101, the data server 101 transfers the requested file to the client 102. Next, the client 102 performs file processing, such as compression and extraction.

Furthermore, in order to improve the return of files from a storage system to a client, several schemes are being used. The schemes may include, for example, a method of utilizing a cache, such as that disclosed in U.S. Patent Application Publication No. US 2011-0202722 A1, entitled 'Mass Storage System and Method of Operating Thereof' (Aug. 18, 2011) and a method of using NAND flash memory having a rapid speed, such as that disclosed in U.S. Patent Application Publication No. US 2011-0213921 A1, entitled 'Command Queuing Smart Storage Transfer Manager for Striping Data to Raw-NAND Flash Modules' (Sep. 1, 2011).

The above techniques, however, describe only the methods of rapidly transferring files to a client, but do not describe a method of minimizing transferred files by performing file processing in advance. Accordingly, the above techniques are problematic in that file processing is not efficiently performed.

SUMMARY OF THE INVENTION

An embodiment of the present invention is directed to reducing unnecessary data transmission and reception in such a manner that a data server for managing files remotely performs processing on a file when a storage system requests the file to be processed remotely and transfers the processed file to the storage system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a file processing method through a data server of a storage system includes receiving a file request from a client, loading a file corresponding to the file request, performing processing requested by the client on the loaded file, generating a result file on which the processing has been performed, and sending the generated result file to the client.

In accordance with another embodiment of the present invention, a data server for processing the files of a storage system includes a network interface unit configured to receive a file request from a client, a storage unit configured to store data files, a supplementary function processing unit configured to load a file corresponding to the file request from the storage unit and generate a result file by performing processing requested by the client on the loaded file, and a control unit configured to perform control so that the generated result file is transmitted to the client via the network interface unit.

DESCRIPTION OF SPECIFIC EMBODIMENTS

Figure 1:
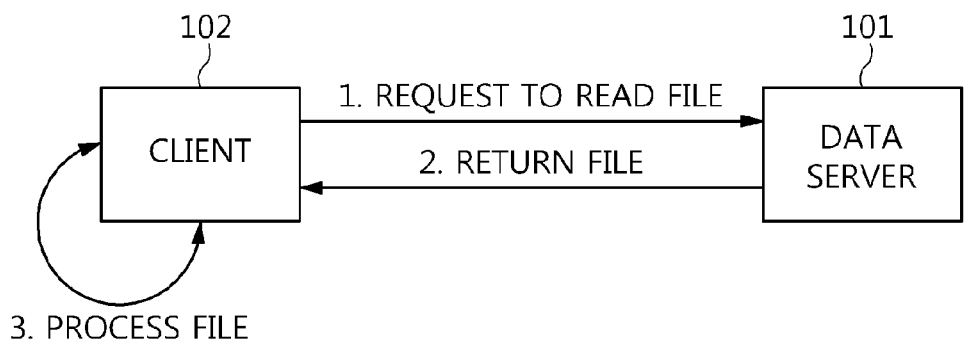
FIG. 1 is a conceptual diagram showing a conventional file processing process.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is also to be noted that the suffixes of elements used in the following description, such as "unit" and "device (or apparatus)," are assigned by taking only the easiness of writing this specification into consideration and the "unit" and the "device (or apparatus)" can be mixed in use, but they may be designed in hardware or software.

Moreover, some exemplary embodiments of the present invention are described in detail with reference to the accompanying drawings and contents described in the drawings, but it is to be noted that the present invention is not limited to or restricted by the embodiments.

Figure 2:
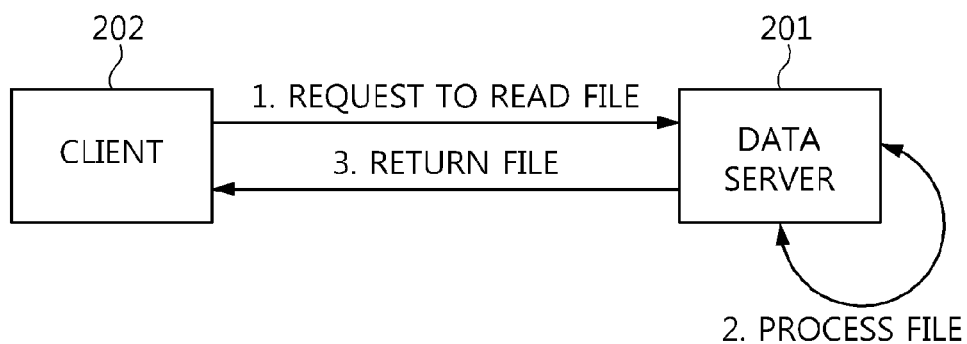
FIG. 2 is a conceptual diagram showing a file processing process in accordance with an embodiment of the present invention.

FIG. 2 is a conceptual diagram showing a file processing process in accordance with an embodiment of the present invention.

In some embodiments, in the present invention, when a client requests a file for data processing which is stored in a storage system, a data server configured to manage files remotely can process the requested file and transfer only a result file to the client.

As shown in FIG. 2, when a data server 201 receives a read request for a file stored in a storage system from a client 202, the data server 201 processes the requested file and sends a result file to the client 202.

Furthermore, the data server 201 can modify the existing file-related system function or provide a new function in order to perform a file processing part that will be performed by the client 202.

That is, if it is expected that the client 202 will perform encoding, compression, and extraction on a file and the size of a result file is smaller than the size of a source file or files, a file having a large size or a plurality of source files is not transmitted to the client 202, but only a result file on which the encoding, compression, and extraction have been performed is transmitted to the client 202 so that file processing can be efficiently performed. Accordingly, if the client 202 is interested in only a result file for a specific application, it is advantageous in terms of resource management efficiency that the data server 201 processes a corresponding file and sends only a result file having a small size to the client 202 without moving the corresponding file to the client 202.

Figure 3:
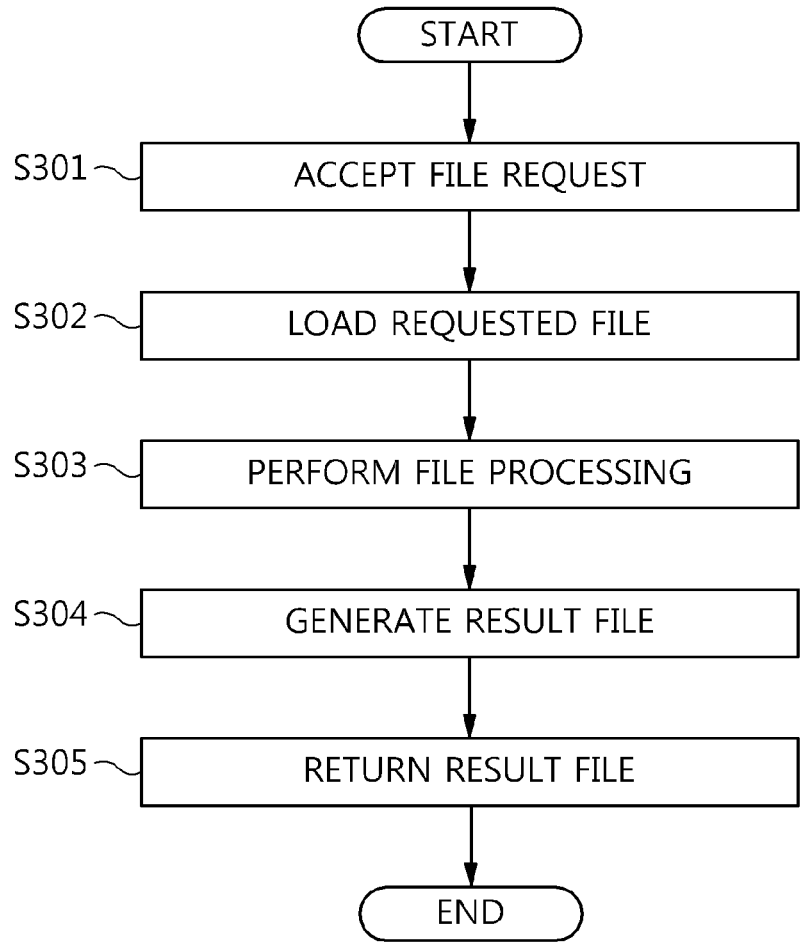
FIG. 3 is a flowchart illustrating a file processing process in a data server in accordance with an embodiment of the present invention.

FIG. 3 is a flowchart illustrating a file processing process in the data server in accordance with an embodiment of the present invention.

First, the data server 201 receives a file request from the client 202 at step S301.

In some embodiments, the file request can include information on a target file and information on a processing command to be performed on the target file.

The data server 201 loads a file corresponding to the file request at step S302.

That is, the data server 201 can search a storage unit for the file corresponding to the file request and load a searched file onto the buffer of the data server 201.

In some embodiments, if a load command is performed in order to load the retrieved file, the data server 201 can perform the load command including a utility command that will be performed on the file corresponding to the file request.

That is, for example, if the present invention is used in a network file system, a Read( ) function provided by the network file system can be extended in order to designate a utility command for processing a specific file. Thus, a command to be performed can be inputted to the Read( ) function like "READ ("tar cvfz compress.tar.gz/test/data")".

Accordingly, the network file system can process the below step of file processing performance at once by performing the utility command, and return the result file to a client.

Next, the data server 201 performs processing requested by the client 202 on the loaded file at step S303.

In some embodiments, the processing requested by the client 202 can include a variety of supplementary functions, such as compression, conversion, and extraction, on the loaded file in addition to file I/O.

In some embodiments, for the purpose of efficient resource management, the size of a result file to be generated, after the processing requested by the client 202 is performed on the loaded file, can be compared with the size of the loaded file. If, as a result of the comparison, it is determined that the size of the result file will be smaller than the size of the loaded file, the processing requested by the client 202 can be performed on the loaded file. That is, when the size of a source file is smaller than the size of the result file, the source file is transmitted without change in order to improve the usage of network resources.

In some embodiments, the data server 201 can store a pre-processing command list of commands which can reduce the amount of data transfer and improve efficiency when the data server 201 performs file processing as described above. The data server 201 can check whether a command for the processing requested by the client 202 is included in the pre-processing command list stored in the data server 201. The data server 201 can perform the processing requested by the client 202 on the loaded file only when the command for the processing requested by the client 202 is included in the pre-processing command list as a result of the check.

Furthermore, in some embodiments, the data server 201 can modify a file-related system function stored therein or generate a new function and provide the generated function in order to perform a file processing part to be performed by the client 202.

Next, the data server 201 generates a result file according to a result of the processing at step S304 and returns the generated result file to the client 202 at step S305.

That is, the amount of data transfer can be reduced through the above process, and a file necessary for the client can be provided to the client although the amount of data transfer is reduced.

Figure 4:
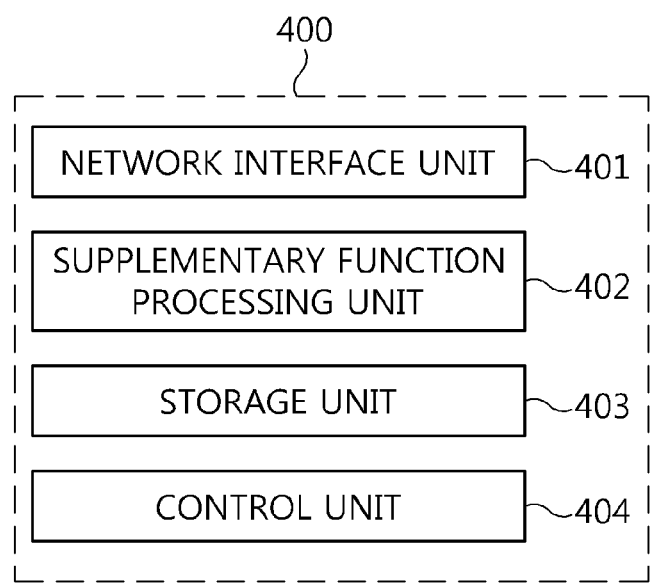
FIG. 4 is a diagram showing a structure of the data server in accordance with an embodiment of the present invention.

FIG. 4 is a diagram showing a structure of the data server in accordance with an embodiment of the present invention.

In some embodiments, the data server included in a storage system and configured to perform file processing can include a network interface unit 401, a supplementary function processing unit 402, a storage unit 403, and a control unit 404.

The network interface unit 401 receives a file request from a client.

The file request can include a target file information and a processing command information for the target file.

The network interface unit 402 can present an interface that can be requested by a client by modifying a file-related system function stored in a data server or generating a new function and providing the generated function.

Furthermore, the supplementary function processing unit 402 can load a file corresponding to the file request of the client from the storage unit 403 and generate a result file by performing processing requested by the client on the loaded file.

In some embodiments, the supplementary function processing unit 402 can search the storage unit 403 for the file corresponding to the file request and load a searched file onto a buffer included in the supplementary function processing unit 402.

Furthermore, in some embodiments, the supplementary function processing unit 402 can load the file corresponding to the file request by performing a load command including a utility command that will be performed on the file corresponding to the file request.

In some embodiments, the supplementary function processing unit 402 can perform a variety of supplementary functions, such as compression, conversion, and extraction, on the loaded file in addition to file I/O. In this supplementary function processing, not only one file, but also a variety of formats, such as a directory, a file set, and part of a file, can be processed.

That is, the load command and the file processing command can be performed at once.

The storage unit 403 can store a data file and further store a pre-processing command list.

The control unit 404 can perform control so that the result file generated by the supplementary function processing unit 402 is transmitted to the client via the network interface unit 401.

In some embodiments, the control unit 404 can perform control so that file processing through the supplementary function processing unit 402 is performed only when a command for processing requested by the client is included in the pre-processing command list stored in the storage unit 403.

Furthermore, in some embodiments, the control unit 404 can compare the size of the result file to be generated after the processing requested by the client is performed on the loaded file with the size of the loaded file. If, as a result of the comparison, it is determined that the size of the result file will be smaller than the size of the loaded file, the control unit 404 can perform control so that the supplementary function processing unit 402 performs the processing requested by the client.

That is, a file transfer format can be changed so that network resources can be efficiently used.

In some embodiments, the storage system can configure a metadata server for managing only metadata separately as occasion demands or can configure a plurality of data servers. In this case, the metadata server can be operated in conjunction with the data servers, only the metadata server can be operated, only the data servers can be operated, or a file processing command in accordance with the present invention can be performed through distributed processing between the data servers.

In the file processing method in accordance with the exemplary embodiment of the present invention, in the state in which the computing power of a data server increase and the redundant resources of the data server increase with the development of high-speed network technology, such as Remote Direct Memory Access (RDMA), there is an advantage in that the bandwidth of the data server can be secured by sufficiently using the redundant resources of the data server and reducing unnecessary data transmission. That is, the resources of a storage system can be efficiently used.

While the present invention has been described with respect to the specific embodiments, it will be apparent to those skilled in the art that various changes and modifications may be made without departing from the spirit and scope of the invention as defined in the following claims.

What is claimed is:

1. A file processing method through a data server of a storage system, comprising:
   receiving a file request from a client;
   loading a file corresponding to the file request;
   performing processing requested by the client on the loaded file, the performing of the processing includes:
      comparing a size of the result file to be generated after the processing requested by the client is performed on the loaded file with a size of the loaded file and
      performing the processing requested by the client on the loaded file if, as a result of the comparison, it is determined that the size of the result file will be smaller than the size of the loaded file;
   generating a result file on which the processing has been performed; and
   sending the generated result file to the client.

2. The file processing method of claim 1, wherein the processing requested by the client comprises supplementary function processing comprising one or more of compression, conversion, and extraction for the loaded file.

3. The file processing method of claim 1, wherein the performing the processing requested by the client comprises performing the processing requested by the client on the loaded file only when a command for the processing requested by the client is included in a pre-processing command list previously stored in the data server.

4. The file processing method of claim 1, wherein the loading a file comprises:
   searching for the file corresponding to the file request in a store unit of the data server; and
   loading the searched file onto a buffer of the data server.

5. The file processing method of claim 1, wherein the receiving a file request from the client comprises receiving the file request, comprising a target file information and a processing command information for the target file, from the client by modifying a file-related system function or generating a new function and providing the generated function.

6. The file processing method of claim 1, wherein the loading a file comprises loading the file corresponding to the file request by performing a load command comprising a utility command to be performed on the file corresponding to the file request.

7. A data server for processing files of a storage system, the data server comprising:
   a network interface unit configured to receive a file request from a client;
   a storage unit configured to store data files;
   a supplementary function processing unit configured to load a file corresponding to the file request from the storage unit and generate a result file by performing processing requested by the client on the loaded file, the supplementary function processing unit performing supplementary function operations comprising compression, conversion, and extraction for the loaded file; and
   a control unit configured to compare a size of the result file to be generated after the processing requested by the client is performed on the loaded file with a size of the loaded file, perform control so that the supplementary function processing unit performs the processing requested by the client if, as a result of the comparison, it is determined that the size of the result file will be smaller than the size of the loaded file or forcibly at the request of a user, and perform control so that the generated result file is transmitted to the client via the network interface unit.

8. The data server of claim 7, wherein the loading of the supplementary function processing unit comprises performing the processing requested by the client on a file, a directory, a file set, or part of a file.

9. The data server of claim 7, wherein:
   the storage unit further stores the pre-processing command list, and
   the control unit performs control so that the supplementary function processing unit performs the processing requested by the client only when a command for the processing requested by the client is included in the pre-processing command list.

10. The data server of claim 7, wherein the supplementary function processing unit searches the storage unit for the file corresponding to the file request and loads the searched file onto a buffer included in the supplementary function processing unit.

11. The data server of claim 7, wherein the supplementary function processing unit performs a file processing part to be performed by the client by modifying a file-related system function stored in the data server or generating a new function and providing the generated function.

12. The data server of claim 7, wherein the network interface unit receives the file request comprising a target file information and a processing command information for the target file from the client.

13. The data server of claim 7, wherein the supplementary function processing unit loads the file corresponding to the file request by performing a load command comprising a utility command to be performed on the file corresponding to the file request and processes the loaded file.

* * * * *